United States Patent
Marsteiner

(10) Patent No.: US 6,449,252 B1
(45) Date of Patent: Sep. 10, 2002

(54) ATM PATH CELL SCHEDULING FOR CONSTANT AND VARIABLE BIT RATE TRAFFIC

(75) Inventor: Timothy Marsteiner, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/336,330

(22) Filed: Jun. 18, 1999

(51) Int. Cl.[7] .............................. H04J 3/17; G06F 15/16
(52) U.S. Cl. ...................... 370/230; 370/232; 370/389; 370/395; 709/227; 709/228
(58) Field of Search ................. 370/230, 232, 370/389, 395; 709/227, 228

(56) References Cited

U.S. PATENT DOCUMENTS

| 5,392,280 A | * | 2/1995 | Zheng ..................... 370/231 |
| 5,619,502 A | * | 4/1997 | Kahn et al. ................ 370/397 |
| 5,748,631 A | * | 5/1998 | Bergantino et al. ......... 370/398 |
| 5,757,771 A | | 5/1998 | Li et al. ..................... 370/235 |
| 5,793,747 A | * | 8/1998 | Kline ........................ 370/230 |
| 5,793,760 A | | 8/1998 | Chopping ................... 370/355 |
| 5,850,398 A | | 12/1998 | King, Jr. .................... 370/412 |
| 5,883,893 A | | 3/1999 | Rumer et al. ............... 370/395 |
| 5,886,907 A | | 3/1999 | Abu-Amara et al. ........ 364/578 |
| 5,898,669 A | * | 4/1999 | Shimony et al. ............ 370/232 |
| 5,987,034 A | | 11/1999 | Simon et al. ............... 370/465 |
| 6,058,114 A | | 5/2000 | Sethuram et al. ........... 370/397 |
| 6,167,049 A | * | 12/2000 | Pei et al. .................... 370/230 |
| 6,272,109 B1 | * | 8/2001 | Pei et al. .................... 370/230 |
| 6,285,657 B1 | * | 9/2001 | Lewis et al. ................ 370/230 |

* cited by examiner

*Primary Examiner*—Krisna Lim
(74) *Attorney, Agent, or Firm*—Cesari & McKenna, LLP

(57) ABSTRACT

A system schedules both CBR and non-CBR traffic on one or more virtual paths in accordance with associated aggregate peak cell rates by including in a stream of data cells strategically placed "CBR opportunity cells." The CBR opportunity calls, which operate essentially as placeholders for the insertion of the CBR cells produced by a conventional AAL1 segmentation and reassembly processor (SAR), are included in the stream at locations that correspond to or exceed the fastest rate at which the associated CBR cells are generated. An add/drop multiplexer queues the CBR cells produced by the AAL1 SAR by virtual path, and replaces the respective CBR opportunity cells in the VBR stream with the queued CBR cells associated with the same virtual path.

14 Claims, 4 Drawing Sheets

ATM PATH CELL SCHEDULING FOR CONSTANT AND VARIABLE BIT RATE TRAFFIC

FIELD OF INVENTION

The invention relates generally to ATM systems and, more particularly, to ATM systems that handle both variable and constant bit rate traffic.

BACKGROUND OF THE INVENTION

Constant bit rate (CBR) traffic is generally processed in accordance with ATM adaptation layer (AAL) 1 by an AAL1 segmentation and reassembly processor (SAR) into an essentially steady stream of ATM cells. Variable bit rate (VBR) traffic, which is bursty in nature, is typically processed into ATM cells in accordance with AAL5 by an AAL5 SAR.

The SARs, which are included in a router, essentially schedule the cells in virtual circuits for transport to the physical layer over the router's internal "UTOPIA" bus. The physical layer then forwards the cell traffic over a WAN connection to an ATM switch, which includes a "policer" that controls the flow of traffic to the ATM network. The policer operates in accordance with a known generic cell rate algorithm (GCRA) that determines for each virtual circuit a minimum time between cells. For a CBR virtual circuit, the traffic parameters typically applied to the GCRA are cell delay variation tolerance (CDVT) and peak cell rate. For a VBR virtual circuit, the parameters typically applied to the GCRA are a sustainable cell rate and maximum burst size. The policer forwards to the ATM network those cells that meet the minimum time between cells associated with the virtual circuit, and discards the cells that do not. For a more detailed discussion of traffic flow parameters refer to Ginsberg, David, *ATM Solutions for Enterprise Internetworking*, Addison-Wesley, 1996.

The CBR traffic typically originates from time-division-multiplexed (TDM) lines, and the framing of the TDM lines basically controls the timing of the generation of the associated AAL1 CBR cells. The cells are thus produced with very little cell delay variation. The AAL1 SAR processor provides the CBR cells to the UTOPIA bus as soon as the cells are generated, nearly preserving the inherent constant timing between the cells. In contrast, the AAL5 VBR cells are produced and sent over the UTOPIA bus in bursts, in accordance with applicable sustainable cell rate and maximum burst size parameters.

Some systems require that all traffic from a given user or set of users travel over a single virtual path that conforms, as an aggregate, to one peak cell rate and CDVT.

A known prior system that produces a traffic stream that conforms to the aggregate parameters includes, in addition to the AAL1 SAR and the AAL5 SAR, a third processor that acts as a "master" scheduler. The master scheduler processor receives and buffers all of the AAL5 data cells and the AAL1 CBR cells into associated queues based on the virtual paths, and reschedules the queued cells to conform to the aggregate traffic parameters. While the master scheduler works well, it requires extensive buffering and adds considerable complexity to the system.

SUMMARY OF THE INVENTION

The invention is a system and a method of operating the system in which VBR data traffic and CBR traffic that are produced by different SARs are scheduled on the same virtual paths by including in an AAL5 data cell stream strategically placed "CBR opportunity cells." Each CBR opportunity cell is associated with a virtual path, and operates essentially as a placeholder for the insertion of a conventional AAL1 CBR cell that is directed to the same virtual path. An add/drop multiplexer, which receives both AAL1 CBR cells produced by a conventional AAL1 SAR and the AAL5 data cell stream with the included CBR opportunity cells, replaces the CBR opportunity cells with the appropriate AAL1 CBR cells, and provides the stream of AAL5 and AAL1 cells to the physical layer.

More specifically, a scheduler that is included in an AAL5 SAR processor controls the timing of the generation of conventional AAL5 data cells that include in their payloads the traffic received from various data sources and, also, the timing of the periodic generation of the CBR opportunity cells from locally-stored "dummy data." Since the CBR opportunity cells are placeholders for the AAL1 CBR cells, the scheduler completely controls the timing of both the CBR cells and the AAL5 data cells for each virtual path. The scheduler thus schedules the cells to meet the aggregate peak cell rate and CDVT associated with the respective virtual paths.

At the same time, the AAL1 SAR produces the AAL1 CBR cells in a conventional manner and provides the cells, as they are produced, to the add/drop multiplexer, which queues the cells by virtual paths. When the multiplexer receives a CBR opportunity cell, the multiplexer replaces the cell with the first CBR cell in the queue that corresponds to the virtual path with which the CBR opportunity cell is associated. If there are no cells queued for the virtual path, the multiplexer blocks the CBR opportunity cell from passing to the physical layer, and the physical layer fills in the gap that results with an idle cell.

To maintain the inherent timing of the AAL1 cells, the scheduler schedules the CBR opportunity cells at rates that slightly exceed the maximum rate at which the associated AAL1 cells are produced. The queues of AAL1 CBR cells are thus kept relatively short, preventing overflow.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
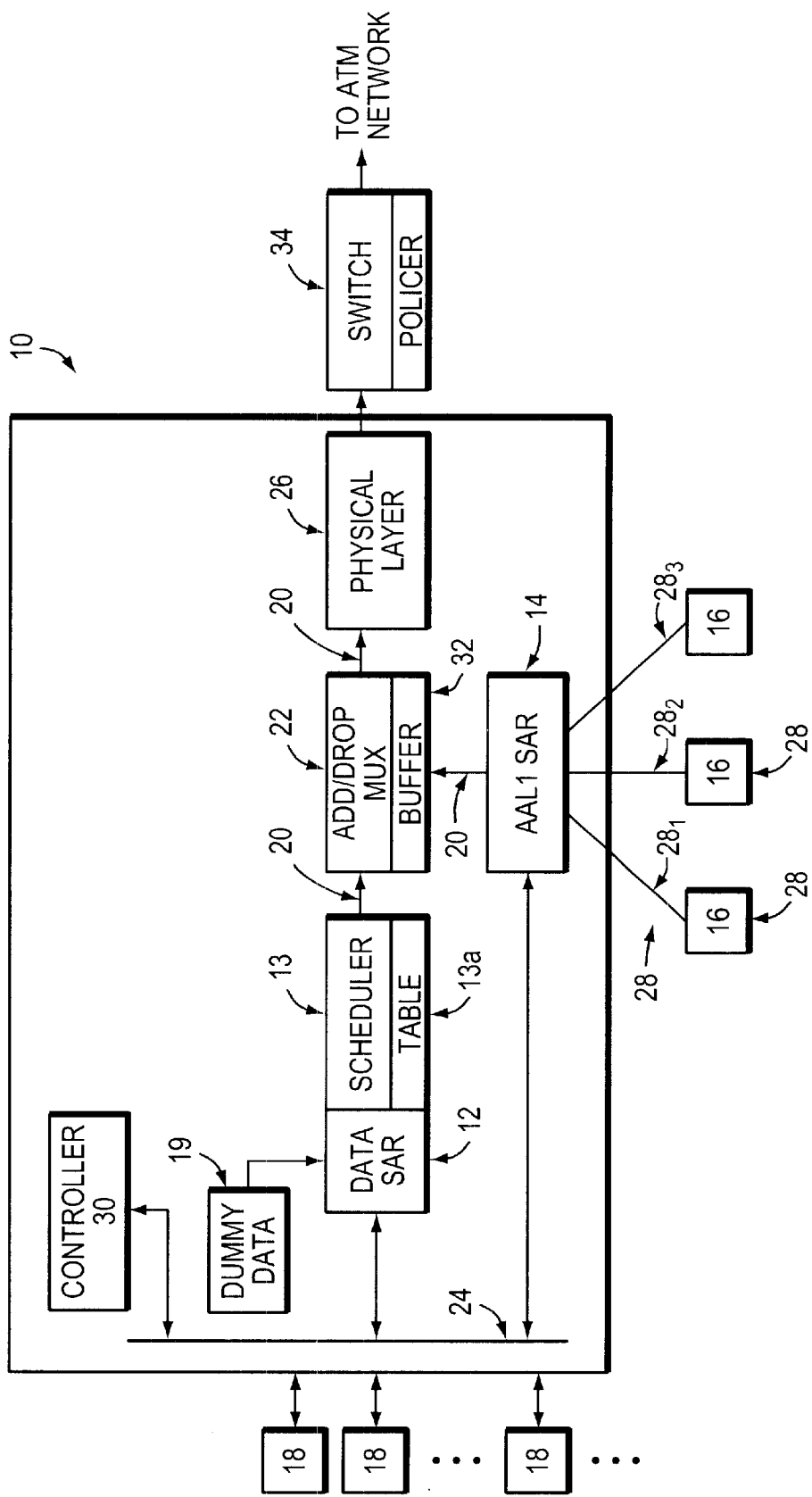
FIG. 1 is a functional block diagram of a system construction in accordance with the invention.

Referring to FIG. 1, a system 10 receives CBR and VBR data traffic from various sources 16 and 18 and produces corresponding AAL1 and AAL5 ATM cells for one or more associated virtual paths. As discussed below, the system schedules the AAL1 and AAL5 cells for each virtual path in accordance with the aggregate traffic parameters associated with the respective virtual paths. The system then forwards the cells through a physical layer 26 to a switch 34 that, in turn, forwards the cells to an ATM network in a conventional manner.

The system 10 includes an AAL1 data segmentation and reassembly processor (SAR) 14 that receives the CBR traffic over TDM lines 28 from the sources 16, which may be, for example, voice or video sources. The AAL1 SAR operates in a conventional manner to produce the corresponding AAL1 cells, which are directed to the one or more is virtual paths. As soon as an AAL1 cell is produced, the AAL1 SAR forwards the cell to an add/drop multiplexer 22, which retains the cell in a queue that corresponds to the virtual path to which the cell is directed.

A data SAR 12 receives the VBR, or data, traffic from the sources 18 over an internal peripheral component interconnect ("PCI") bus 24. Further, the data SAR 12 has available from a source 19 locally-stored "dummy data" that the data SAR 12 associates with the respective sources 16. As discussed in more detail below, the data SAR 12 produces for the one or more virtual paths both AAL5 cells that include the data from the PCI bus and "CBR opportunity cells" that include the dummy data.

Each CBR opportunity cell is essentially a placeholder for the insertion of an AAL1 cell that is directed to the virtual path with which the CBR opportunity cell is associated. A scheduler 13 schedules the timing of the generation of the AAL5 data cells and the CBR opportunity cells by virtual path, so that the cells conform to the associated aggregate traffic parameters, that is, conform to the known generic cell rate algorithm, or GCRA. The data SAR 12 thus produces a stream of data cells that consists of AAL5 data cells and includes strategically positioned CBR opportunity cells. The data SAR 12 may be, for example, a Rockwell Brooktree 8234 SAR.

The data SAR 12 forwards the scheduled cells over an internal UTOPIA bus 20 to add/drop multiplexer 22. As discussed in more detail below, the add/drop multiplexer replaces the CBR opportunity cells on the UTOPIA bus with the AAL1 cells from the appropriate queues, and the AAL5 data and AAL1 CBR cells are then forwarded over the UTOPIA bus to the physical layer 26. The physical layer operates in a conventional manner, to transmit the cells to the switch 34. The switch 34, which includes a policer 23, also operates in a conventional manner to control the flow of cells to the ATM network, typically by forwarding to the network the cells that meet the GCRA and discarding the cells that do not.

When a connection is set up, the controller 30 determines the schedule for sending both AAL1 and AAL5 cells over the associated virtual path, based on the aggregate peak cell rate and CDVT associated with the virtual path and, also, on the bandwidth required for the CBR traffic on the TDM lines, as discussed in more detail below. The controller 30 then provides the schedule to the data SAR 12 along with cell headers that are associated with the respective sources 18 and the CBR opportunity cells for each of the virtual paths. The headers associated with the respective sources 18 are conventional, and thus, each header includes virtual path and virtual circuit indices that identify the associated connection. As discussed in more detail below with reference to FIG. 2, the headers associated with the CBR opportunity cells include information that identifies the cell as a CBR opportunity cell and points to the virtual path with which the cell is associated.

A scheduler 13 populates a scheduling table 13a in accordance with the schedule provided by the controller 30. The scheduled table entries indicate the source from which a next cell payload is to be obtained and, also, the header that is to be included in the cell. Based on the scheduling table, the processor produces a stream of cells that includes, for each of the one or more virtual paths, the associated data cells and strategically placed CBR opportunity cells.

In the system depicted in the drawing, the dummy data for the payload of the CBR opportunity cells is held in an SRAM 19, essentially to avoid congestion on the PCI bus 22. The data SAR 12 thus repeatedly segments the same data to form the CBR opportunity cells. The dummy data may instead be provided over the PCI bus, or any other connection to the data SAR. The content of the dummy data, regardless of how the data is made available to the data SAR, is of no consequence since the data is not transmitted to the ATM network. Indeed, the dummy data is made essentially continuously available to the data SAR so that the processor will have sufficient data available to form the CBR opportunity cells at each of the scheduled times.

When the connection is set up, the controller 30 similarly provides to the AAL1 SAR 14 the headers that are associated with the respective sources 16. Each header, in a conventional manner, includes the virtual path and virtual circuit indices that correspond to the connection.

As discussed above, the AAL1 SAR 14 receives the CBR traffic over one or more TDM lines 28. The AAL1 SAR operates in a conventional manner to segment the traffic into cells based on the timeslots assigned to each virtual circuit, and produces AAL1 CBR cells that are directed to the one or more virtual paths. As soon as the cells are produced, they are provided to the multiplexer 22. The multiplexer 22 queues the AAL1 cells by virtual paths and retains them in a buffer 32. The buffer may, for example, be an SRAM that holds a maximum number of cells per virtual path queue such as, for example, two cells per queue. Alternatively, the multiplexer, which is implemented as a field programmable gate array, may directly retain the queued cells.

Each time the multiplexer 22 receives a CBR opportunity cell from the data SAR 12, the multiplexer determines if it has any cells in the queue that corresponds to the virtual path that is identified in the header of the CBR opportunity cell. If so, the multi-plexer replaces the CBR opportunity cell with the first cell from the appropriate queue. If the queue is empty, the multiplexer 22 discards or blocks the CBR opportunity cell, to prevent the cell from being supplied to the physical layer 26. The physical layer then, in a conventional manner, fills the gap in the traffic stream with conventional idle cells.

Figure 2:
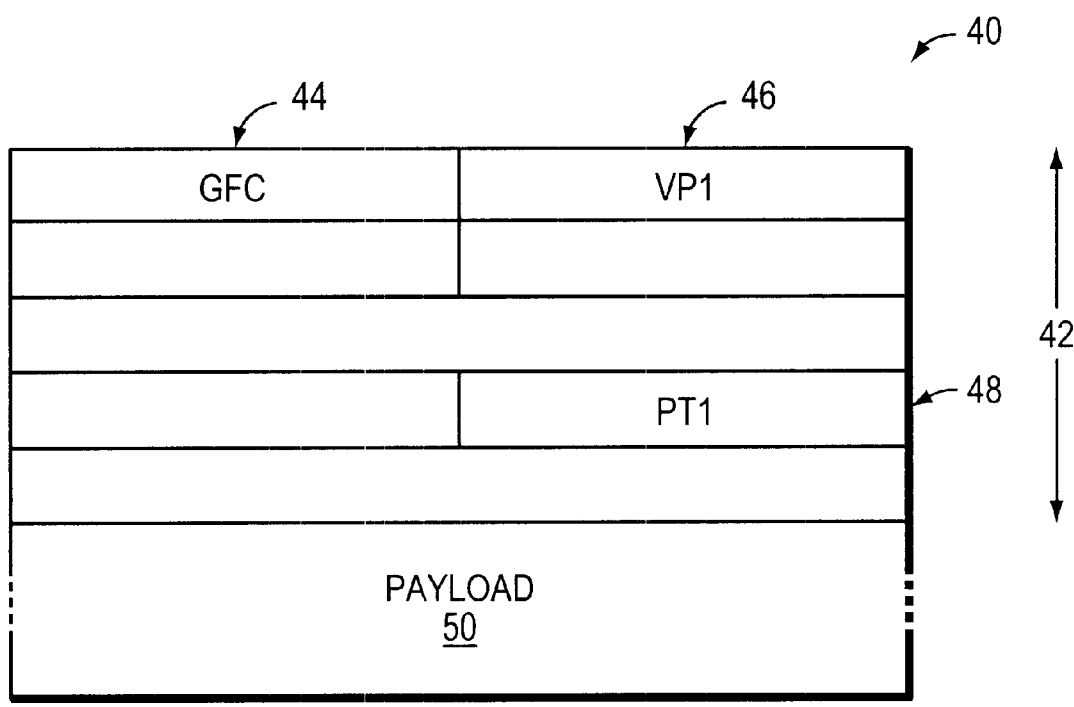
FIG. 2 is a diagram of a format for a CBR opportunity cell.

Referring now to FIG. 2, the header 42 of the CBR opportunity cell 40 includes pertinent information in at least a generic flow control (GFC) field 44. The CBR opportunity cell may, but need not, include information in the VPI/VCI field 46 or the other header fields (not shown) that are typically present in conventional ATM cell headers. As discussed, the CBR opportunity cell 40 includes a cell payload 50 of dummy data.

In accordance with ATM specifications, the GFC field 44 consists of four bits. In the exemplary system, the three least significant bits of the GFC field are used to designate that the cell is a CBR opportunity cell. If one or more of the three bits are non-zero, they designate that the cell is a CBR opportunity cell, and also point to the virtual path with which the cell is associated. For example, a pattern with the last three bits set to 001 represents a CBR opportunity for virtual path number 1, a pattern of 010 represents a CBR opportunity for virtual path number 2 and so forth. The system may, however, use any one-to-one mapping of the GFC bit patterns to the virtual paths. As appropriate, the system may use all of the GFC field bits to point to the virtual paths. Alternatively, the system may use the GFC field to designate that the cell is a CBR opportunity cell, and include the pointer to the virtual path in the VPI/VCI field 46.

If OAM cells or other non-AAL1 cells are sent over the virtual paths, the multiplexer 22 looks also at a three-bit Payload Type Index (PTI) field 48 to differentiate between various types of cells that may have non-zero GFC fields. The PTI field bits are set to patterns that conform to the ATM standards, and thus, the OAM cells have a particular PTI pattern. When the multiplexer in such a system receives a cell with a nonzero GFC field, the multiplexer checks the PTI field to determine if the cell is an OAM cell. If so, the multiplex passes the cell. If not, the multiplexer next determines if the cell is a CBR opportunity cell and, as appropriate, replaces or blocks the cell. The system may instead use different indices or patterns, or different header fields to indicate the cell types, as long as CBR opportunity cells are distinguishable from the other non-AAL1 cells.

As discussed above, the multiplexer 22 replaces the CBR opportunity cells with AAL1 CBR cells directed to the same virtual path. Alternatively, the multiplexer 22 may replace the cell payload 50 of the CBR opportunity cell with the payload of the queued CBR cell, and reset the GFC field 44 in the CBR opportunity cell header to all zeros. In this way, the multiplier 22 or buffer 32 need not retain the headers of the queued CBR cells. Alternatively, the system may set the GFC fields in the headers of the AAL1 cells to patterns that map to the virtual paths to which the cells are directed, and the multiplexer then replaces the CBR opportunity cells with the AAL1 cells that have matching GFC fields.

As discussed above, the controller 30 produces a schedule that controls, for each virtual path, the timing of the generation of the AAL5 data cells and the CBR opportunity cells. The controller essentially schedules the times at which the data SAR looks to the source 19 for the next cell payload and the times at which the data SAR looks to each of the sources 18 for the next cell payload, and consequently, which header to include in the next cell. The dummy data is always available, so the scheduler sets the intervals between the successive CBR opportunity cells associated with the respective virtual paths. This, in turn, controls the relative times at which the associated AAL1 CBR cells may be forwarded over the UTOPIA bus 20 to the physical layer 26. The data from the sources 18 may not always be available, and there may thus be varying numbers of AAL5 cells and/or gaps between the regularly-spaced CBR opportunity cells. The CBR opportunity cells are given priority over the AAL5 data cells, so that the data cells do not disrupt the periodic generation of the CBR opportunity cells.

Figure 3:
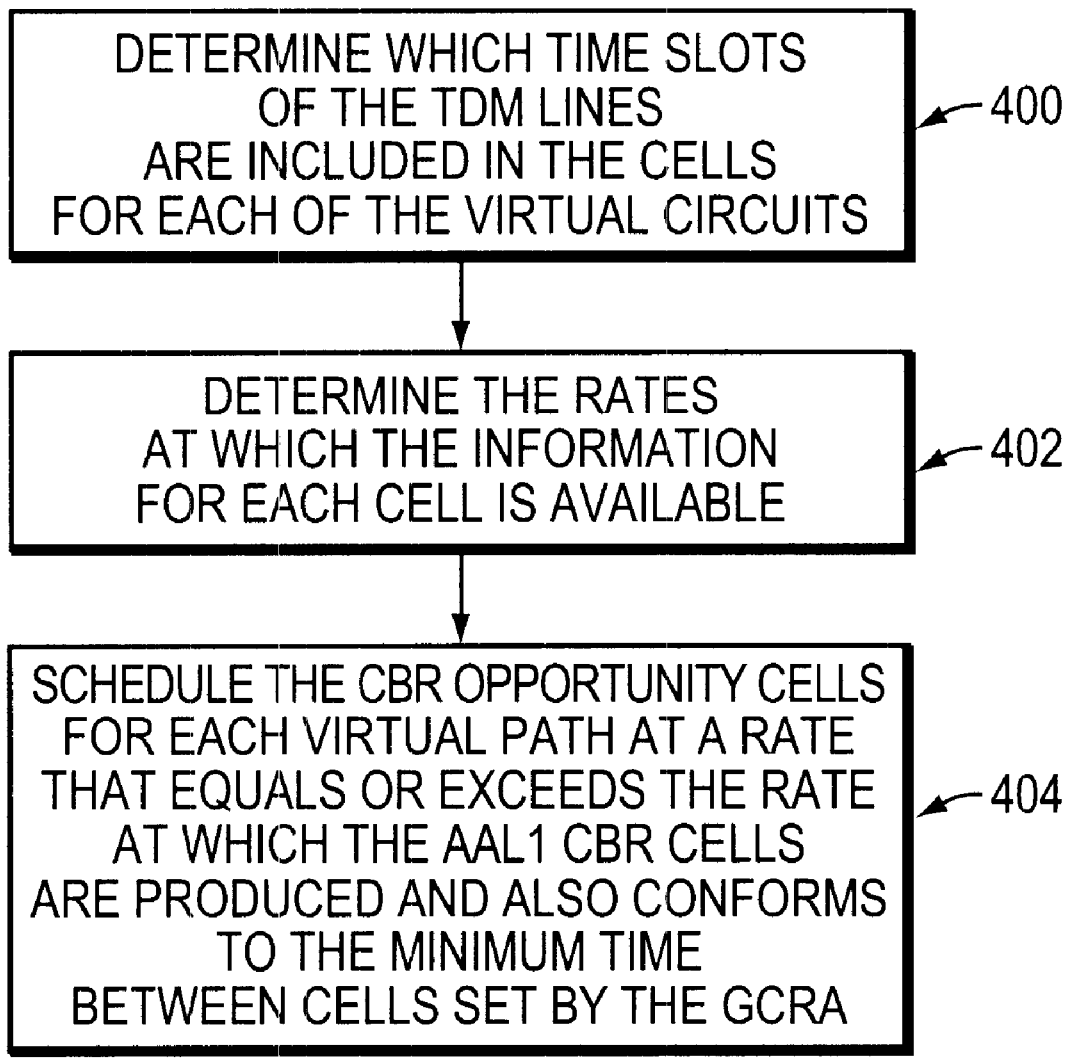
FIG. 3 is a flowchart of the operations of the system.
Figure 4:
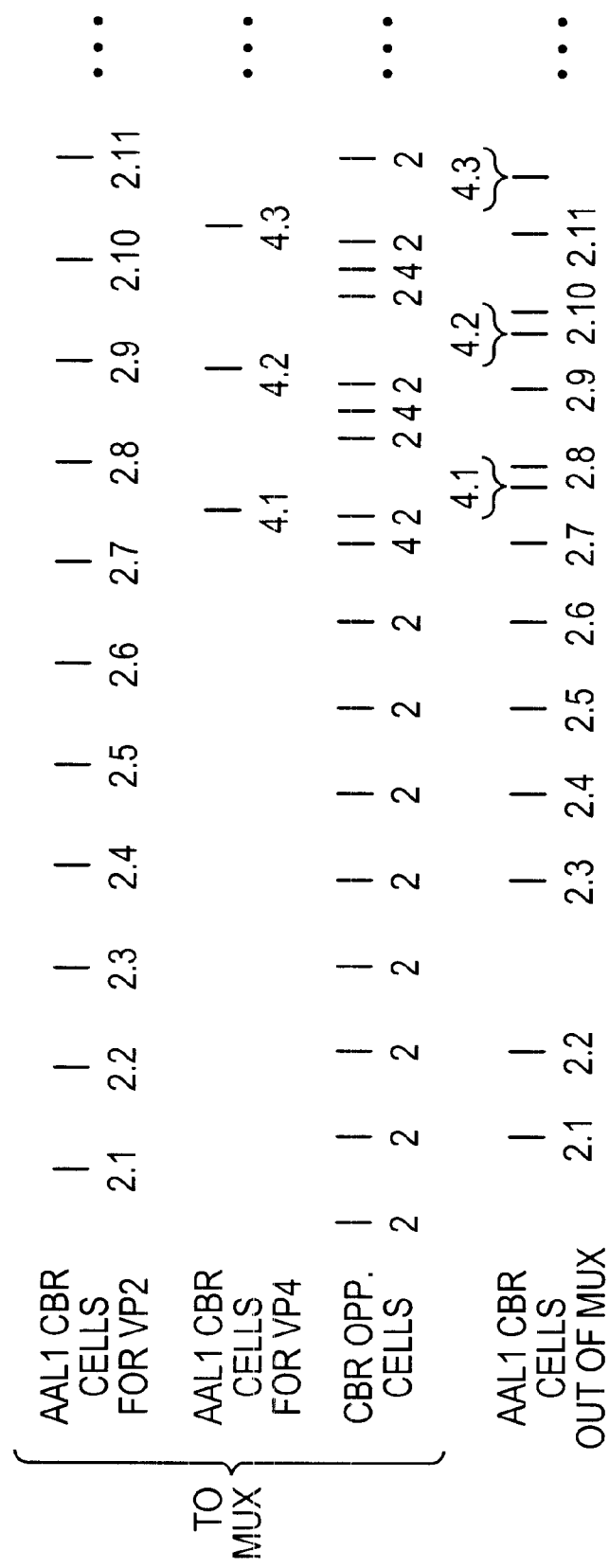
FIG. 4 is a timeline for the operations of the system.

Referring now to FIGS. 3 and 4, to produce the schedule, the controller 30 first determines for each connection which time slots of the respective TDM frames are to be combined into cells (step 400). For example, the controller determines that time slots 1, 2 and 5 of each TDM frame on line $28_1$ are to be combined into a cell that is directed to virtual path 2 while the time slots 13, 14 and 15 of each TDM frame on line $28_2$ are combined into a cell that is directed to virtual path 4, and so forth. The controller 30 also determines, in a conventional manner, if the cells are to be zero-padded. Based on the TDM framing on the respective TDM lines, the controller then determines the rates at which the information is available at the AAL1 SAR for the formation of the respective cells (step 402). The controller next schedules the CBR opportunity cells associated with each virtual path at intervals that relate to the rate at which the associated AAL1 CBR cells can be generated, and also conform to the applicable peak cell rate and CDVT parameters. The scheduled CBR opportunity cells for each virtual path thus do not violate the applicable minimum time between cells set by the GCRA (step 404).

The operations of scheduler 13 are not generally synchronized to the timing that controls the generation of the AAL1 cells. Accordingly, the controller 30 schedules the CBR opportunity cells at rates that slightly exceed the maximum rates at which the associated AAL1 cells are to be produced. The CBR opportunity cells will thus arrive at the multiplexer either slightly before or slightly after the associated AAL1 cells are produced. If the AAL1 cell arrives at the multiplexer shortly after an associated CBR opportunity cell has passed, the AAL1 cells is held for the next associated CBR opportunity cell, which should arrive before the generation of the next AAL1 cell that is directed to the same virtual path. Accordingly, the queues of cells will be relatively short and overflow is prevented. Further, the cell delay variation introduced into the AAL1 traffic will be relatively small, even minimal, when compared with the cell delay variation that is typically introduced by the ATM network.

FIG. 4 depicts a time line that shows the relationship between the generation of the various cells by the data SAR 12 and the AAL1 SAR 14. The AAL1 SAR generates the AAL1 CBR cells associated with the virtual paths 2 and 4 at regular intervals that are associated with the framing of the respective TDM lines 28. The data SAR similarly generates the CBR opportunity cells for the two virtual paths at regular intervals that are associated with the bandwidth required to forward the AAL1 cells without appreciable delay to the physical layer 26. As shown in the time line, the rates at which the CBR opportunity cells are generated for the virtual paths slightly exceed the rates at which the associated AAL1 CBR cells are generated, so that "missing" a CBR opportunity cell does not introduce a significant delay into the timing of the AAL1 CBR cells on the UTOPIA bus. This can be seen from the timing of the cells out of the multiplexer, as depicted in the drawing.

The data SAR 12 periodically produces the CBR opportunity cells for every virtual path, regardless of whether or not one or more CBR virtual circuits included in the connection are currently active or idle. The data SAR 12 stops producing the CBR opportunity cells for a given virtual path only after the connection is torn down. Accordingly, the scheduler 13 does not require traffic information from the AAL1 SAR 14 and/or the sources 16. The system 10 thus does not require a buffer that is large enough to hold both the VBR and CBR cells, or any on-going communication between the respective sources of the VBR and CBR traffic for a given virtual path, in order to schedule the VBR and CBR cells over a virtual path in accordance with an aggregate peak cell rate and CDVT.

The foregoing description has been limited to a specific embodiment of this invention. It will be apparent, however, that variations and modifications may be made to the invention, such as scheduling various types of opportunity cells as place holders for various types of non-VBR traffic, with the attainment of some or all of its advantages. Therefore, it is the object of the appended claims to cover all such variations and modifications as come within the true spirit and scope of the invention.

What is claimed is:

1. A system for scheduling VBR and CBR traffic over a virtual path, the system including:
   A. an AAL1 processor for producing AAL1 CBR cells that include the CBR traffic;
   B. a data processor for
      i. producing AAL5 data cells that include the VBR traffic,
      ii. periodically producing CBR opportunity cells at times that are associated with a maximum rate at which the CBR processor can produce the AAL1 CBR cells for the virtual path, and iii. producing in accordance with traffic parameters associated with the virtual path, a stream of cells that includes the AAL5 data cells and periodically placed CBR opportunity cells;

C. a multiplexer for receiving the stream of cells from the data processor and the AAL1 CBR cells from the AAL1 processor, the multiplexer replacing the CBR opportunity cells with the AAL1 CBR cells in the order in which the AAL1 CBR cells are produced.

2. The system of claim 1 wherein the data processor includes means for providing dummy data for inclusion in the CBR opportunity-cells.

3. A system for scheduling over one or more virtual paths CBR and VBR traffic from one or more sources, the system including:

A. an AAL1 processor for receiving CBR traffic from one or more sources and generating AAL1 CBR cells that include the CBR traffic and are directed over one or more virtual paths;

B. a data processor for
  i. receiving data traffic from one or more sources and generating AAL5 data cells that include the data and are directed to the one or more virtual paths,
  ii. periodically generating CBR opportunity cells that are associated with each of the one or more virtual paths, and
  iii. scheduling the data cells and the CBR opportunity cells in accordance with traffic parameters that are associated with the respective virtual paths and producing a stream of cells that includes the data cells and periodically spaced CBR opportunity cells; and C. a multiplexer for receiving the stream of cells from the data processor and the cells from the AAL1 processor, the multiplexer replacing a given CBR opportunity cell with the next AAL1 CBR cell that is directed to the same virtual path.

4. The system of claim 3 wherein the multiplexer queues the AAL1 CBR cells by virtual path and replaces the CBR opportunity cell associated with a given virtual path with the first AAL1 CBR cell in the queue that corresponds to the given virtual path.

5. A method of scheduling CBR and VBR traffic over one or more virtual paths, the method including the steps of:

A. producing AAL1 CBR cells that include CBR traffic from one or more sources of CBR traffic;

B. producing data cells that include VBR traffic from one or more sources of VBR traffic;

C. producing CBR opportunity cells for the one or more virtual paths at times that are associated with a maximum rate at which the AAL1 CBR cells from the various sources can be produced;

D. scheduling the data cells and the CBR opportunity cells over the one or more virtual paths in accordance with traffic parameters that are associated with the respective virtual paths to produce a stream of cells that includes the data cells and periodically spaced CBR opportunity cells;

F. replacing a given CBR opportunity cell in the stream of cells with the next AAL1 CBR cell directed to the same virtual path; and G. forwarding the data and the CBR cells over a network connection.

6. The method of claim 5 further including the step of blocking a given CBR opportunity cell if there is no next CBR cell directed to the same virtual path.

7. The method of claim 5 further including in the step of producing the CBR cells, the step of queuing the CBR cells by virtual path.

8. The method of claim 5 wherein the step of producing the CBR opportunity cells includes producing the cells associated with a given virtual path at intervals that are associated with or exceed the maximum rates at which the CBR cells associated with the given virtual path may be produced.

9. The method of claim 5 wherein the step of producing the CBR opportunity cells includes segmenting dummy data and associating the data with CBR opportunity cell headers.

10. The method of claim 5 wherein the step of replacing the CBR opportunity cell includes determining the virtual path with which the cell is associated from the cell header and replacing the cell with next CBR cell that is directed to the same virtual path.

11. The method of claim 9 wherein the step of replacing the CBR opportunity cells further includes replacing the dummy data with the CBR traffic that is included in the next CBR cell that is directed to the same virtual path.

12. The method of claim 7 wherein the step of replacing the CBR opportunity cells includes the step of replacing the CBR opportunity cell with the first CBR cell in the queue that corresponds the virtual path with which the CBR opportunity is associated.

13. A system for scheduling CBR and non-CBR traffic over one or more virtual paths, the system including:

A. a CBR processor for receiving CBR traffic from one or more sources and generating one or more CBR cells that are directed to the one or more virtual paths;

B. a data processor for
  i. receiving non-CBR traffic from one or more sources and generating data cells that include the non-CBR traffic, and are directed to the one or more virtual paths,
  ii. periodically generating CBR opportunity cells at rates that are associated with the maximum rates at which the CBR cells can be produced for the respective virtual paths; and
  iii. scheduling for transmission over a connection the data cells and the CBR opportunity cells in accordance with traffic parameters associated with the respective virtual paths, and producing a stream of cells that includes the data cells and periodically placed CBR opportunity cells; and C. a multiplexer for receiving the CBR cells from the CBR processor and the stream of data and CBR opportunity cells from the data processor and replacing the cell payload of a given CBR opportunity cell with the cell payload of the CBR cell that is directed to the same virtual path.

14. The system of claim 13 wherein the multiplexer further replaces the header of CBR opportunity cell with the header of the associated CBR cell.

* * * * *